(12) United States Patent
Bai

(10) Patent No.: US 11,579,436 B2
(45) Date of Patent: Feb. 14, 2023

(54) LIGHT SHIELD DEVICE, LIGHT SHIELD CONTROL METHOD, ELECTRONIC DEVICE AND VEHICLE

(71) Applicants: BEIJING BOE DISPLAY TECHNOLOGY CO., LTD., Beijing (CN); BOE TECHNOLOGY GROUP CO., LTD., Beijing (CN)

(72) Inventor: Bing Bai, Beijing (CN)

(73) Assignees: BEIJING BOE DISPLAY TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 807 days.

(21) Appl. No.: 16/438,542

(22) Filed: Jun. 12, 2019

(65) Prior Publication Data

US 2020/0055379 A1 Feb. 20, 2020

(30) Foreign Application Priority Data

Aug. 15, 2018 (CN) .......................... 201810929650.2

(51) Int. Cl.
*G02B 26/00* (2006.01)
*B60J 3/04* (2006.01)
(Continued)

(52) U.S. Cl.
CPC .............. *G02B 26/005* (2013.01); *B60J 3/04* (2013.01); *G02B 26/004* (2013.01); *B60J 1/02* (2013.01); *G02B 27/0172* (2013.01); *G02F 1/167* (2013.01)

(58) Field of Classification Search
CPC ............................ G02B 26/005; G02B 26/004; G02B 27/0172; B60J 3/04; B60J 1/02; G02F 1/167
See application file for complete search history.

(56) References Cited

U.S. PATENT DOCUMENTS

| 4,270,517 A | * | 6/1981 | Stephens | ................. F24S 40/10 |
| | | | | 126/599 |
| 2003/0020915 A1 | * | 1/2003 | Schueller | .............. B01L 3/5027 |
| | | | | 430/1 |

(Continued)

FOREIGN PATENT DOCUMENTS

| CN | 2061536 U | 9/1990 |
| CN | 101750733 | 6/2010 |

(Continued)

OTHER PUBLICATIONS

Chinese Office Action in corresponding Chinese Application No. 201810929650.2 dated Oct. 31, 2019 (an English translation attached hereto). 16 pages.

(Continued)

*Primary Examiner* — George G. King
(74) *Attorney, Agent, or Firm* — Leason Ellis LLP

(57) ABSTRACT

A light shield device, a light shield control method, an electronic device and a vehicle are provided. The light shield device includes a controller module and a light shield structure, the light shield structure includes an accommodating cavity, an electrowetting material being in the accommodating cavity and having a light-shielding property, and at least one fluid tube which is communicated with the accommodating cavity; and the controller module is configured to apply a voltage to the light shield structure, so that wettability of a surface of the at least one fluid tube is changed to allow the electrowetting material to fill the at least one fluid tube.

17 Claims, 4 Drawing Sheets

(51) Int. Cl.
  *B60J 1/02*   (2006.01)
  *G02B 27/01*  (2006.01)
  *G02F 1/167*  (2019.01)

(56) References Cited

U.S. PATENT DOCUMENTS

| | | | |
|---|---|---|---|
| 2010/0149621 A1 | 6/2010 | Shiu et al. | |
| 2012/0264932 A1* | 10/2012 | Van Dam | C07B 59/002 |
| | | | 422/186 |
| 2012/0320445 A1 | 12/2012 | Yang et al. | |
| 2018/0039071 A1* | 2/2018 | He | G02B 26/005 |
| 2018/0364487 A1* | 12/2018 | Yeoh | G02B 5/18 |

FOREIGN PATENT DOCUMENTS

| | | |
|---|---|---|
| CN | 102269867 A | 12/2011 |
| CN | 104950491 A | 9/2015 |
| CN | 105857035 A | 8/2016 |
| CN | 105911690 A | 8/2016 |
| CN | 106004366 A | 10/2016 |

OTHER PUBLICATIONS

Chinese Patent Office Action dated Jul. 23, 2020 corresponding to Chinese Patent Application No. 201810929650.2 16 pages.

* cited by examiner

LIGHT SHIELD DEVICE, LIGHT SHIELD CONTROL METHOD, ELECTRONIC DEVICE AND VEHICLE

This application claims the benefit of Chinese patent application No. 201810929650.2 filed on Aug. 15, 2018, which is hereby entirely incorporated by reference as a part of the present application.

TECHNICAL FIELD

Embodiments of the present disclose relates to a light shield device, a light shield control method, an electronic device and a vehicle.

BACKGROUND

When the vehicle is driven at night, the high beam is usually used for watching a road ahead. However, the driver's abuse or non-standard use of the high beam leads to a hidden danger to road safety. For example, when a vehicle driven at night meets another vehicle in front of the vehicle, a driver does not switch the high beam to the low beam, so that a driver or a pedestrian in front of the vehicle is exposed to strong light, resulting in visual blind spots, which causes traffic accidents to occur frequently and seriously jeopardizes road safety. At present, there are no effective technical solutions to prevent or eliminate the abuse of the high beam. Thus, how to eliminate the impact of the high beam on the driver so as to avoid the visual blind spots and improve the safety of night driving has become a research hotspot.

SUMMARY

Embodiments of the present disclose provide a light shield device, a light shield control method, an electronic device and a vehicle, so as to reduce the impact of high beam on drivers and improve driving safety.

The embodiments of the present disclose provide a light shield device which includes a controller module and a light shield structure, the light shield structure includes an accommodating cavity, an electrowetting material being in the accommodating cavity and having a light-shielding property, and at least one fluid tube which is communicated with the accommodating cavity; and the controller module is configured to apply a voltage to the light shield structure, so that wettability of a surface of the at least one fluid tube is changed to allow the electrowetting material to fill the at least one fluid tube.

For example, the controller module is configured to apply a voltage difference between the electrowetting material and the at least one fluid tube or apply the voltage difference between two opposite side walls of each fluid tube among the at least one fluid tube, so as to apply the voltage to the light shield structure.

For example, the at least one fluid tube includes a plurality of fluid tubes arranged side by side.

For example, a gap is between adjacent fluid tubes among the plurality of fluid tubes.

For example, the light shield device further includes an ambient light sensor module electrically connected with the controller module, the ambient light sensor module is configured to detect an intensity of ambient light; and the controller module is further configured to determine whether the intensity of the ambient light is greater than or equal to a first threshold, and apply the voltage to the light shield structure in presence of a determination that the intensity of the ambient light is greater than or equal to the first threshold.

For example, the at least one fluid tube includes first fluid tubes and second fluid tubes which are sequentially and alternately arranged; in presence of the determination by the controller module that the intensity of the ambient light is greater than or equal to the first threshold, the controller module is configured to apply the voltage to the light shield structure, so that wettability of surfaces of the first fluid tubes are changed to allow the electrowetting material to fill the first fluid tubes; the controller module is further configured to determine whether the intensity of the ambient light is greater than or equal to a second threshold and apply the voltage to the light shield structure in presence of a determination that the intensity of the ambient light is greater than or equal to the second threshold, so that wettability of surfaces of the second fluid tubes are changed to allow the electrowetting material to fill the second fluid tubes, and the second threshold is greater than the first threshold.

For example, the at least one fluid tube includes a first fluid tube and a second fluid tube which are sequentially arranged; and the controller module is configured to apply a voltage to a region where the first fluid tube is located and a region where the second fluid tube is located respectively at different times, so that the electrowetting material fills the first fluid tube and the second fluid tube respectively at different times.

For example, in a length direction of the at least one fluid tube, a surface which is comprised by the at least one fluid tube and is configured to contact the electrowetting material is provided with a plurality of voltage applier units; and in applying the voltage to the light shield structure by the controller module, the controller module is configured to sequentially increase voltages respectively corresponding to the plurality of voltage applier units in a direction from the accommodating cavity to the fluid tube.

For example, in removing the voltage from the light shield structure by the controller module, the controller module is configured to sequentially remove the voltages respectively corresponding to the plurality of voltage applier units in a direction from the fluid tube to the accommodating cavity.

For example, the plurality of voltage applier units are transparent electrodes.

For example, the accommodating cavity includes a plurality of sub-accommodating units; the at least one fluid tube includes a plurality of fluid tubes arranged side by side; the plurality of fluid tubes are communicated with the plurality of sub-accommodating units in a one-to-one manner; and the electrowetting material is in the sub-accommodating units.

For example, the electrowetting material includes electronic ink.

For example, the at least one fluid tube includes a plurality of fluid tubes; and end portions which are respectively comprised by the plurality of fluid tubes and are on a same side of the light shield structure are communicated with each other.

For example, each liquid tube among the at least one fluid tube is a transparent insulating tube.

The embodiments of the present disclosure further provide a light shield control method which includes: applying a voltage to a light shield structure by a controller module, so that a light shield material in an accommodating cavity of the light shield structure fills at least one fluid tube of the light shield structure, and the at least one fluid tube is communicated with the accommodating cavity.

For example, the voltage is applied to the light shield structure by the controller module to change wettability of a surface of the at least one fluid tube so that the light shield material fills the at least one fluid tube.

For example, the voltage is applied to the light shield structure by the controller module, so that a volume of the accommodating cavity is changed to allow the light shield material to fill the at least one fluid tube.

The embodiments of the present disclosure further provides an electronic device which includes the light shield device according to any one of the above embodiments.

The embodiments of the present disclosure further provides a vehicle which includes a front windshield and the light shield device which is described above, and the light shield device is on a surface of the front windshield.

The embodiments of the present disclosure further provides another light shield device which includes a light shield structure, and the light shield structure includes an accommodating cavity, a light shield material in the accommodating cavity, and at least one fluid tube, and the at least one fluid tube is communicated with the accommodating cavity; the light shield device is configured to allow the light shield material to fill the at least one fluid tube.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects. The phrases "connect", "connected", etc., are not intended to define a physical connection or mechanical connection, but may include an electrical connection, directly or indirectly. "On," "under," "right," "left" and the like are only used to indicate relative position relationship, and when the position of the object which is described is changed, the relative position relationship may be changed accordingly.

Figure 1:
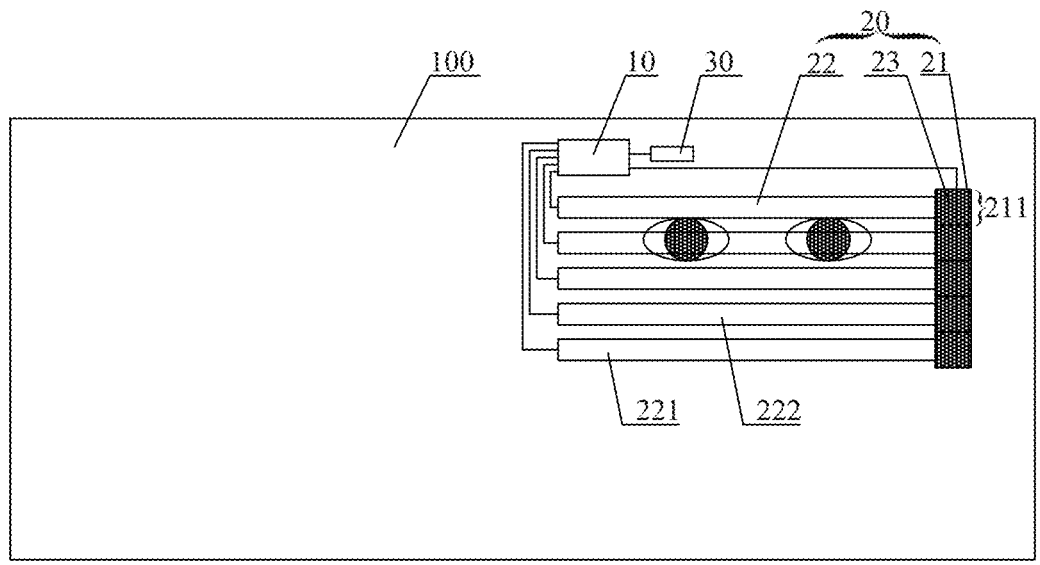
FIG. 1 is a schematic structural view illustrating the case that a light shield device provided by at least one embodiment is disposed on a front windshield of a vehicle.
Figure 2:
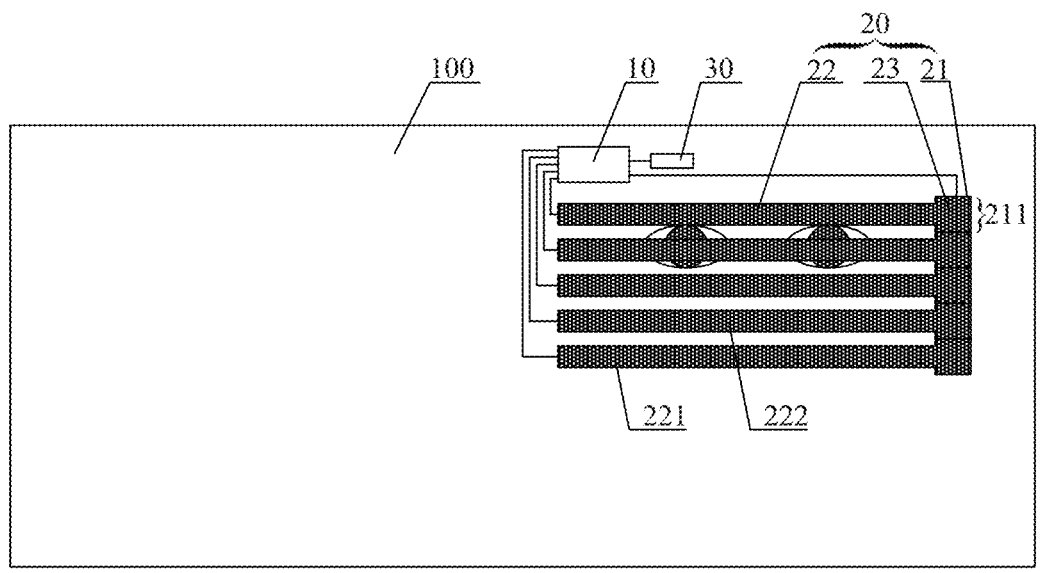
FIG. 2 is a schematic structural view illustrating the case that light is shielded by the light shield device in FIG. 1.

FIG. 1 is a schematic structural view illustrating the case that a light shield device provided by at least one embodiment of the present disclosure is disposed on a front windshield of a vehicle. In FIG. 1, the light shield device is disposed in a region of the front windshield 100 corresponding to a driver (ellipses in FIG. 1 schematically shows the driver's eyes) and is configured to shield light for the driver. FIG. 2 is a schematic structural view illustrating the case that the light is shielded by the light shield device in FIG. 1. As can be seen from FIGS. 1 and 2, the light shield device provided by the embodiment of the present disclosure comprises a controller module 10 and a light shield structure 20. The controller module 10 is, for instance, a controller such as a processor. The light shield structure 20 includes an accommodating cavity 21 and at least one fluid tube (namely a tube for accommodating a fluid) 22 (description is given in FIGS. 1 and 2 by taking a plurality of fluid tubes 22 arranged side by side as an example), and the at least one fluid tube 22 is communicated with the accommodating cavity 21. The light shield structure 20 further includes an electrowetting material 23 being disposed in the accommodating cavity 21 and having a light-shielding property. The controller module 10 is configured to apply a voltage to the light shield structure 20, so that the wettability of a surface of the at least one fluid tube 22 (namely an inner surface of the at least one fluid tube 22) is changed to allow the electrowetting material to fill the at least one fluid tube 22. In at least one embodiment of the present disclosure, for instance, in the embodiment shown in FIG. 1 and FIG. 2, the controller module 10 applies a voltage difference which is greater than 0 between the electrowetting material and the at least one fluid tube 22, so as to change the wettability of contact surfaces between the electrowetting material and the at least one fluid tube 22, so that the electrowetting material fills the at least one fluid tube 22, as shown in FIG. 2.

In the light shield device provided by the embodiment of the present disclosure, the light shield structure 20 includes at least one fluid tube 22 (for instance, the plurality of fluid tubes 22 arranged side by side); after the controller module 10 applies the voltage to the light shield structure 20, the wettability of the surface which is included by the fluid tube 22 and is configured to contact the electrowetting material is improved, so that a three-phase contact angle between an outer edge of the electrowetting material and the surface of the fluid tube 22 is changed, which deforms droplets at the outer edge of the electrowetting material, drives the droplets at the outer edge of the electrowetting material to continuously move along the surface of the fluid tube, and then allows the outer edge of the electrowetting material to move along the surface of the fluid tube, so that the electrowetting material fills the fluid tube. Because the electrowetting material have the light-shielding property, the fluid tube filled with the electrowetting material shields the light. In a situation where the light shield device provided by the embodiment of the present disclosure is disposed on the front windshield at the position of the driver, when the high beam of an opposite vehicle is illuminated, the light shield device is activated, so that the fluid tube filled with the electrowetting material blocks the light of the high beam, thereby reducing the light intensity of the high beam, preventing the light of the high beam from causing visual blind spots for the driver, and improving the safety of night driving. When the opposite vehicle passes, the voltage applied to the light shield structure is removed, so that the wettability of the surface which is included by the fluid tube and contacts the electrowetting material restores the previous state, the electrowetting material then restores the previous state, which allows the fluid tube to be not filled with the electrowetting material, and thus light can be transmitted through the light shield device, so that the driver can restore normal driving. In the light shield device provided by the embodiment of the present disclosure, a louver structure is formed; when the high beam of the opposite vehicle is illuminated, the louver structure light shield device is closed to shield light; and when the opposite vehicle passes, the louver structure light shield device is opened, and the driver restores the normal driving.

Electrowetting (EW) refers to changing the wettability of a droplet on a substrate by changing the voltage between the droplet and the insulating substrate, that is, changing the contact angle to deform and to move the droplet. Wetting is one of the main properties of a solid surface. Liquid can spread on the solid surface, and the solid-liquid contact surface has a tendency to expand, that is, the adhesion of the liquid to the solid surface is greater than the cohesive force of the liquid, which is wetting. The liquid cannot spread on the solid surface, and the contact surface which is included by the liquid and contacts the solid surface has a tendency to shrink into a spherical shape, which is non-wetting, that is, the adhesion of the liquid to the solid surface is less than the cohesive force of the liquid. The wetting effect of the solid surface can be changed by adoption of voltage, making the solid surface more hydrophilic, i.e., enhancing the wettability of the solid surface.

In the embodiment of the present disclosure, for example, the electrowetting material is electronic ink; and the color of the electronic ink may be black, gray or the like color that has the light-shielding property. It is easy to understand that the electrowetting material can also be other material as long as it has the light-shielding property.

Figure 3:
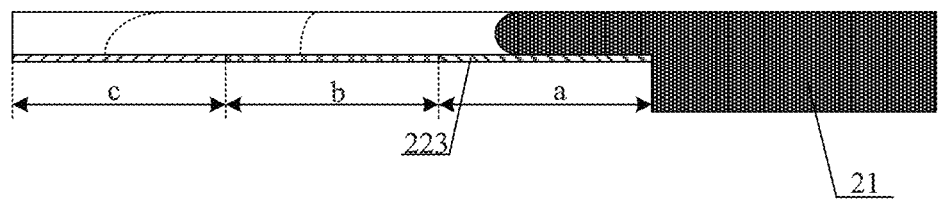
FIG. 3 is a schematic structural sectional view of a fluid tube in FIG. 1.

For instance, the controller module 10 is configured to apply the voltage difference to the electrowetting material 23 and the fluid tube 22 (as shown in FIGS. 1 and 3), or the controller module 10 is configured to apply the voltage difference to two opposite side walls of the fluid tube 22, so as to apply the voltage to the light shield structure.

FIG. 3 is a schematic structural sectional view of the fluid tube in FIG. 1. As shown in FIG. 3, when the electrowetting material does not fill the fluid tube 22, in order to allow normal light to run through the light shield device, a material of the fluid tube is a transparent material. For instance, the fluid tube 22 is a transparent insulating tube. Moreover, in a process that the electrowetting material flows into the fluid tube 22, the electrowetting material directly contacts the inner surface of the fluid tube 22. As can be seen from FIG. 3, for instance, in a length direction of the fluid tube 22, a plurality of voltage applier units 223 are disposed on the surface which is included by the fluid tube and is configured to contact the electrowetting material. For instance, the voltage applier units 223 are transparent electrodes. The controller module 10 applies the voltage to the voltage applier units 223 and the electrowetting material through conducting wires as shown in FIG. 1, so as to apply the voltage difference between the fluid tube and the electrowetting material. In order to ensure that the electrowetting material can rapidly fill the fluid tube along a predetermined direction, for instance, voltage differences respectively between the voltage applier units 223 and the electrowetting material are gradually increased in a direction from the accommodating cavity 21 to the fluid tube. For instance, in FIG. 3, the voltage difference between the voltage applier unit c and the electrowetting material>the voltage difference between the voltage applier unit b and the electrowetting material>the voltage difference between the voltage applier unit a and the electrowetting material, so the wettability of an area corresponding to the voltage applier unit c>the wettability of an area corresponding to the voltage applier unit b>the wettability of an area corresponding to the voltage applier unit a. Thus, the outer edge of the electrowetting material can rapidly fill the fluid tube along the a→b→c direction, thereby preventing the electrowetting material from fluctuating in the area corresponding to the voltage applier units and accelerating the filling speed of the electrowetting material in the fluid tube, so that the fluid tube can block the light of the high beam in time, thereby preventing the light of the high beam from being irradiated to human eyes to produce the visual blind spots, further improving the safety of night driving.

The shapes of the outer edges of the electrowetting material in the three voltage applier units at different times are shown in FIG. 3, respectively. Because the voltage difference between the voltage applier unit c and the electrowetting material>the voltage difference between the voltage applier unit b and the electrowetting material>the voltage difference between the voltage applier unit a and the electrowetting material, in the a→b→c direction, the three-phase contact angles between the outer edges of the electrowetting material and the surface of the fluid tube are sequentially reduced, that is, the wettability of the surface of the fluid tube is sequentially improved in the a→b→c direction.

In order to prevent residual droplets of the electrowetting material in the fluid tube after the voltage difference applied between the electrowetting material and the fluid tube is removed, in removing the voltage difference, the voltage differences applied between the voltage applier units 223 and the electrowetting material are sequentially removed in a direction from the fluid tube 22 to the accommodating cavity 21, so that the electrowetting material can be gradually restored to the previous state, thereby avoiding the residual droplets of the electrowetting material in the fluid tube.

As shown in FIG. 1, the accommodating cavity 21 is disposed on the right of the windshield. In order to prevent the influence of gravity on the electrowetting material from causing the fluid tube disposed on the upper part of the windshield to be not filled with the electrowetting material in time, the accommodating cavity 21 includes a plurality of sub-accommodating units (namely sub-accommodating cavities) 211 which are separated from each other; the sub-accommodating units 211 are in one-to-one correspondence with the fluid tubes 22; and each sub-accommodating unit 211 is accommodated with the electrowetting material that can fill corresponding fluid tube 22.

As can be seen from FIG. 1, in the light shield device provided by the embodiment of the present disclosure, the plurality of fluid tubes 22 are sequentially arranged and spaced apart from each other. Thus, when the light shield device is disposed on the front windshield, because the fluid tubes 22 are sequentially arranged and spaced apart from each other, namely there are gaps among adjacent fluid tubes 22, even the electrowetting material fills the fluid tubes, the driver can still observe the front of the vehicle through the gaps among the fluid tubes 22, so the normal driving of the driver is not affected.

Figure 5:
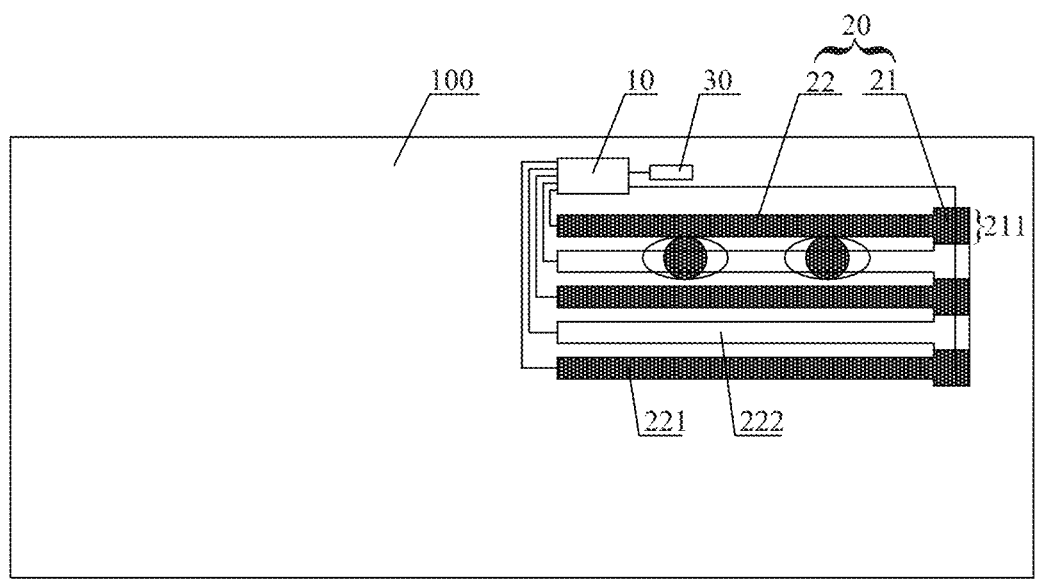
FIG. 5 is a schematic structural view illustrating the case that an electrowetting material is filled in first fluid tubes.

For instance, as shown in FIG. 1, the at least one fluid tube 22 of the light shield structure 20 includes first fluid tubes 221 and second fluid tubes 222 which are sequentially arranged; and the controller module 10 is configured to: apply a first voltage to an area provided with the first fluid tubes 221 so that the electrowetting material 23 fills the first fluid tubes 221 (as shown in FIG. 5), and apply a second voltage to an area provided with the second fluid tubes 222 so that the electrowetting material 23 fills the second fluid tubes 222 (as shown in FIG. 2). By adoption of such means that a voltage is applied to a region where the first fluid tube is located and a region where the second fluid tube is located respectively at different times, so that the electrowetting material fills the first fluid tube and the second fluid tube respectively at different times, different light-shielding degrees can be realized. For instance, the first voltage and the second voltage may be same or different.

As can be seen from FIG. 1, the light shield device provided by the embodiment of the present disclosure may further include an ambient light sensor module 30. The ambient light sensor module 30 is electrically connected with the controller module 10. The ambient light sensor module 30 is configured to detect the intensity of ambient light in front of the vehicle and transmit the intensity information of the ambient light to the controller module. The controller module determines whether the intensity of the ambient light is greater than or equal to a first threshold. When the intensity of the ambient light in front of the vehicle is greater than or equal to the first threshold, it indicates that the opposite vehicle turns on the high beam, and the controller module applies the voltage difference between the electrowetting material and the fluid tubes, so that the electrowetting material can fill the fluid tubes to block the light of the high beam, thereby reducing the intensity of light irradiated to the human eyes, preventing the light of the high beam from causing visual blind spots for the driver, and improving the safety of driving at night. After the opposite vehicle passes, the controller module compares the received intensity of the ambient light with the first threshold, when the intensity of the ambient light is less than the first threshold, the controller module removes the applied voltage difference, and the electrowetting material restores the previous state. In the embodiment of the present disclosure, for instance, the ambient light sensor module 30 is a photosensor such as a photodiode or a phototransistor; for example, the ambient light sensor module is a light intensity sensor. In other embodiments, the ambient light sensor module may also adopt other settings capable of sensing the light intensity.

Figure 4:
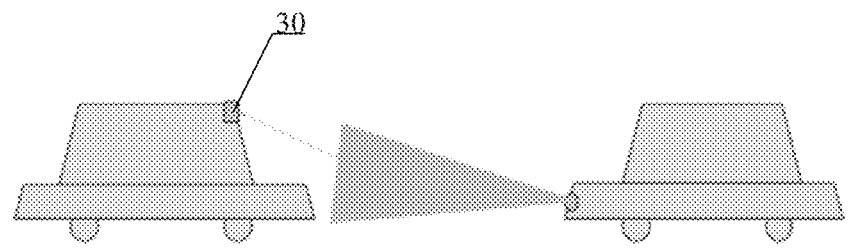
FIG. 4 is a schematic structural view illustrating the case that two vehicles run in opposite directions.

FIG. 4 is a schematic structural view illustrating the case that two vehicles run in opposite directions. In FIG. 4, the light shield device provided by the embodiment of the present disclosure is disposed on the front windshield of the left vehicle. As can be seen from FIG. 4, when the right vehicle turns on the high beam, the light of the high beam is irradiated to the front of the left vehicle. In order to ensure that the ambient light sensor module 30 can accurately detect the intensity of ambient light, for instance, the ambient light sensor module 30 can be disposed on an upper side of an area of the front windshield corresponding to the driver, and this position is relatively close to the eyes of the driver, so the intensity of the light irradiated to the human eyes can be more accurately detected, and then the controller module can more accurately apply the voltage difference between the electrowetting material and the fluid tubes, thereby preventing the starting of the light shield structure in the case of weak intensity of the light irradiated to the human eyes, and avoiding the impact on normal driving.

Before the light shield device shields the light, the intensity of ambient light is relatively high; after the light shield device shields the light, the light in front suddenly becomes weak for the driver, which easily causes that the driver cannot quickly adapt to the sudden darkening of the light, thereby causing safety hazard. In order to prevent the driver from driving in a flickering environment, the plurality of fluid tubes 22 include the first fluid tubes 221 and the second fluid tubes 222 which are sequentially and alternately arranged, and the structures of the first fluid tubes 221 and the second fluid tubes 222 are the same. In specific implementation, the fluid tubes disposed in odd rows can be defined as the first fluid tubes 221, and the fluid tubes disposed in even rows can be defined as the second fluid tubes 222. The ambient light sensor module 30 detects the intensity of ambient light in front of the vehicle and transmits the intensity information of the ambient light to the controller module. The controller module compares the intensity of ambient light with both the first threshold and the second threshold (the second threshold is greater than the first threshold). When the intensity of ambient light is greater than or equal to the first threshold and less than the second threshold, it indicates that the opposite vehicle turns on the high beam but is relatively far away from the driver's vehicle; at this point, the controller module applies the voltage difference between the electrowetting material and the first fluid tubes 221, so that the electrowetting material fills the first fluid tubes 221 to block the light of the high beam, as shown in FIG. 5 which is a schematic structural view obtained after the first fluid tubes are filled with the electrowetting material. Because only the first fluid tubes 221 disposed in the odd rows shield the light, the brightness of the light in front does not change too much for the driver, so that it is easy for the driver to accept and adapt to this change, thus ensuring the driver's driving safety. When the intensity of ambient light is greater than or equal to the second threshold, it indicates that the opposite vehicle is close to the driver's vehicle; at this point, the controller module applies the voltage difference between the electrowetting material and the second fluid tubes 222, so that the electrowetting material fills the second fluid tubes 222, and thus the first fluid tubes 221 and the second fluid tubes 222 simultaneously block the light of the high beam, as shown in FIG. 2, thereby avoiding too strong light of the high beam from being irradiated into the human eyes to cause visual blind spots. Because the first fluid tubes shield the light at first and then the first fluid tubes and the second fluid tubes simultaneously shield the light, the intensity of the light in front is converted from strong to weak and then to weaker as for the driver, that is, the front brightness is converted from bright to dark and then to darker, so the light shield device can realize the smooth shielding of the light, avoid excessive shielding, prevent the driver from driving in the flickering environment, and improve driving safety. Similarly, after the opposite vehicle passes, the controller module compares the received intensity of ambient light with the first threshold, when the intensity of ambient light is less than the first threshold, the controller module removes the applied voltage difference. The controller module can remove the voltage difference between the first fluid tubes and the electrowetting material at first and then remove the voltage difference between the second fluid tubes and the electrowetting material, so the light shield device can realize the smooth release of the light, prevent the driver from driving in the flickering environment, and further improve the driving safety.

For instance, more gradients can be also set for the light shield device, so that the light shield device can more smoothly block and release light, further improving the driver's adaptability to ambient light and ensuring driving safety. For instance, each three fluid tubes are in one group and respectively defined as the first fluid tube, the second fluid tube and a third fluid tube, and a third threshold>the second threshold>the first threshold. When the intensity of ambient light is greater than or equal to the first threshold and less than the second threshold, the controller module applies the voltage difference between the electrowetting material and the first fluid tubes, so that the electrowetting material fills the first fluid tubes, and the first fluid tubes shield the light; when the intensity of ambient light is greater than or equal to the second threshold and less than the third threshold, the controller module applies the voltage difference between the electrowetting material and the second fluid tubes, so that the electrowetting material fills the second fluid tubes, and the second fluid tubes and the first fluid tubes simultaneously shield the light; and when the intensity of ambient light is greater than or equal to the third threshold, the controller module applies the voltage difference between the electrowetting material and the third fluid tubes, so that the electrowetting material fills the third fluid tubes, and the third fluid tubes, the second fluid tubes and the first fluid tubes simultaneously shield the light. Similarly, after the opposite vehicle passes, the voltage difference applied between the first fluid tubes and the electrowetting material, the voltage difference applied between the second fluid tubes and the electrowetting material, and the voltage difference applied between the third fluid tubes and the electrowetting material can be sequentially removed.

For instance, the first threshold, the second threshold and the third threshold are determined according to different adaptedness of the human eyes to ambient light.

Figure 6:
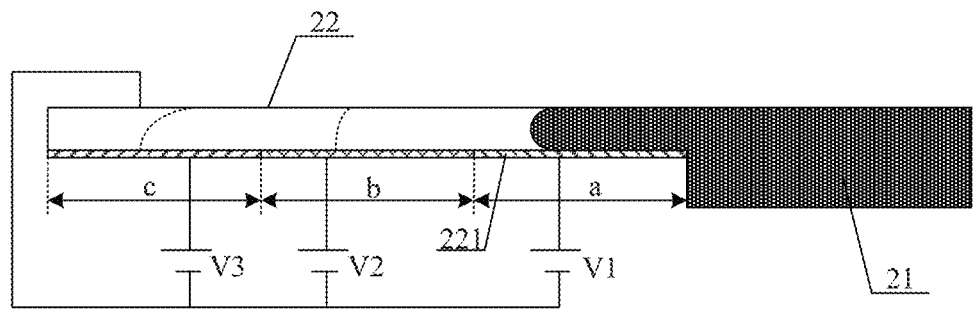
FIG. 6 is a schematic structural sectional view of the fluid tube of the light shield device provided by at least another one embodiment of the present disclosure.

FIG. 6 is a schematic structural sectional view of the fluid tube in the light shield device provided by another embodiment of the present disclosure. As different from the embodiment as shown in FIG. 3, in the embodiment as shown in FIG. 6, the controller module applies the voltage to the light shield structure by applying the voltage difference between two opposite side walls of the fluid tube. In FIG. 6, the controller module applies the voltage difference between an upper side wall and a lower side wall of the fluid tube to change the wettability of the surface of the fluid tube, so that the electrowetting material fills the fluid tube.

In the embodiment of the present disclosure, as shown in FIG. 6, in the length direction of the fluid tube 22, the lower side wall of the fluid tube is provided with the plurality of voltage applier units 223 (for instance, transparent electrodes), and the controller module applies the voltage difference between the upper side wall of the fluid tube and the voltage applier units 223. In the direction from the accommodating cavity 21 to the fluid tube, the voltage differences respectively applied between the voltage applier units 223 and the upper side wall are gradually increased. For instance, the lower side wall of the fluid tube is provided with three voltage applier units which are respectively the voltage applier unit c, the voltage applier unit b and the voltage applier unit c. The voltage difference between the voltage applier unit c and the upper side wall is V3; the voltage difference between the voltage applier unit b and the upper side wall is V2; the voltage difference between the voltage applier unit a and the upper side wall is V1; and V3>V2>V1. Thus, the outer edge of the electrowetting material can rapidly fill the fluid tube along the a→b→c direction, thereby preventing the electrowetting material from fluctuating in the area corresponding to the voltage applier units and accelerating the filling speed of the electrowetting material in the fluid tube, so that the fluid tube can block the light of the high beam in time, prevent the light of the high beam from being irradiated to the human eyes to produce visual blind spots, and further improve the safety of night driving.

Figure 7:
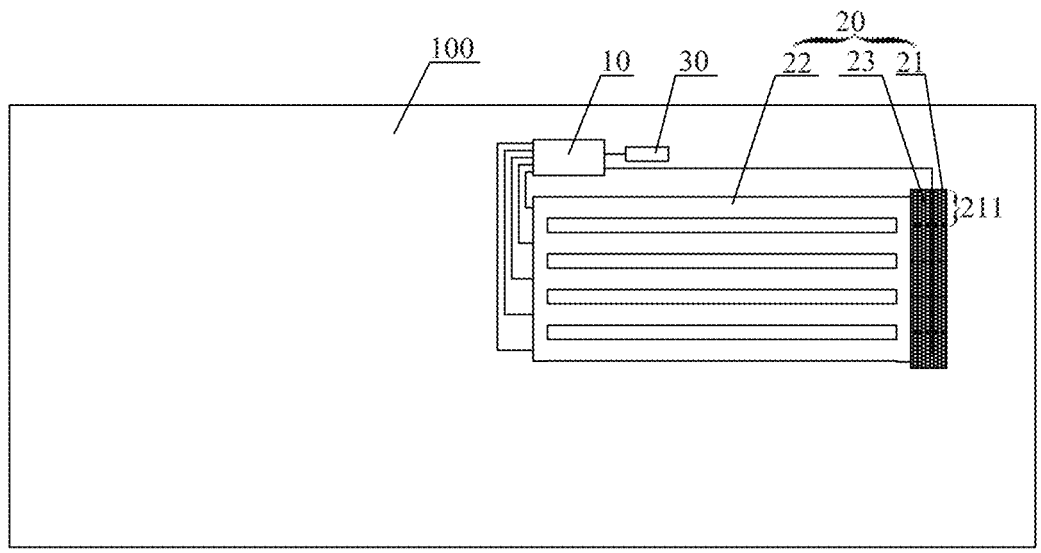
FIG. 7 is a schematic structural view illustrating the case that the light shield device provided by at least still another one embodiment of the present disclosure is disposed on the front windshield of the vehicle.

In other embodiments, for instance, as shown in FIG. 7, end portions which are respectively included by the plurality of fluid tubes 22 of the light shield structure 20 and are disposed on a same side of the light shield structure 20, are communicated with each other. As shown in FIG. 7, left ends of the plurality of fluid tubes 222 are directly communicated and right ends are also directly communicated. In some other embodiments, only the left ends or the right ends are directly communicated.

It should be noted that as for the embodiments as shown in FIGS. 1 and 7, when the light shield device includes the voltage applier units, an orthographic projection of each voltage applier unit on the front windshield 100 roughly coincides with an orthographic projection of the fluid tube 22 corresponding to the voltage applier unit on the front windshield 100.

At least one embodiment of the present disclosure provides a light shield control method, which is, for instance, applied to the light shield device as shown in FIGS. 1 and 7. The method includes: applying the voltage to the light shield structure 20 by the controller module 10, so that a light shield material (for instance, the electrowetting material 23 or other types of material having the light-shielding property) in the accommodating cavity 21 of the light shield structure 20 fills the at least one fluid tube 22 of the light shield structure 20. The at least one fluid tube 22 is communicated with the accommodating cavity 21.

For instance, the voltage is applied to the light shield structure 20 by the controller module 10 to change the wettability of the surface of the at least one fluid tube 22, so that the light shield material fills the at least one fluid tube 22. In some other embodiments, for instance, the voltage is applied to the light shield structure 20 by the controller module 10 to change the volume of the accommodating cavity 21, so that the light shield material fills the at least one fluid tube 22. For instance, the accommodating cavity 21 may adopt a variable volume container commonly used in the field. The embodiments of the present disclosure include but are not limited to the utilization of manners such as the control of the electrowetting property of the light shield material and the adoption of the variable volume accommodating cavity, as long as the light shield material can fill the fluid tube.

For instance, in the light shield control method provided by at least one embodiment of the present disclosure, in the situation where the light shield material is the electrowetting material, the controller module is configured to apply the voltage difference to the light shield material and the at least one fluid tube, or the controller module is configured to apply the voltage difference to two opposite side walls of each fluid tube among the at least one fluid tube, so as to apply the voltage to the light shield structure.

For instance, the light shield control method provided by at least one embodiment of the present disclosure further includes: detecting the intensity of ambient light by the ambient light sensor module; and determining whether the intensity of the ambient light is greater than or equal to the first threshold. The voltage is applied to the light shield structure in presence of the determination that the intensity of the ambient light in front of the vehicle is greater than or equal to the first threshold.

For instance, the light shield control method provided by at least one embodiment of the present disclosure further includes: applying the voltage to the region where the first fluid tube is located and the region where the second fluid tube is located respectively at different times, so that the light shield material fills the first fluid tube and the second fluid tube respectively at different times. The first fluid tube and the second fluid tube are arranged sequentially.

For instance, in the light shield control method provided by at least one embodiment of the present disclosure, the voltage is applied to the light shield structure in presence of the determination that the intensity of the ambient light is greater than or equal to the first threshold, so that the light shield material fills the first fluid tubes among the at least one fluid tube; the voltage is applied to the light shield structure in presence of the determination that the intensity of the ambient light is greater than or equal to the second threshold, so that the light shield material fills the second fluid tubes among the at least one fluid tube. The second threshold is greater than the first threshold, and the first fluid tubes and the second fluid tubes are arranged sequentially and alternately.

For instance, in the light shield control method provided by at least one embodiment of the present disclosure, the voltage is applied to the light shield structure via the plurality of voltage applier units which are sequentially arranged along the length direction of the fluid tube, and the voltages respectively corresponding to the plurality of voltage applier units increase sequentially in the direction from the accommodating cavity to the fluid tube.

For instance, in the light shield control method provided by at least one embodiment of the present disclosure, the voltages respectively corresponding to the plurality of voltage applier units are sequentially removed in the direction from the fluid tube to the accommodating cavity, so as to remove the voltage from the light shield structure.

The manners of setting and controlling the same components in the light shield control method provided by the embodiments of the present disclosure can refer to the description in the embodiments of the light shield device, and the details are not repeated here.

Figure 8A:
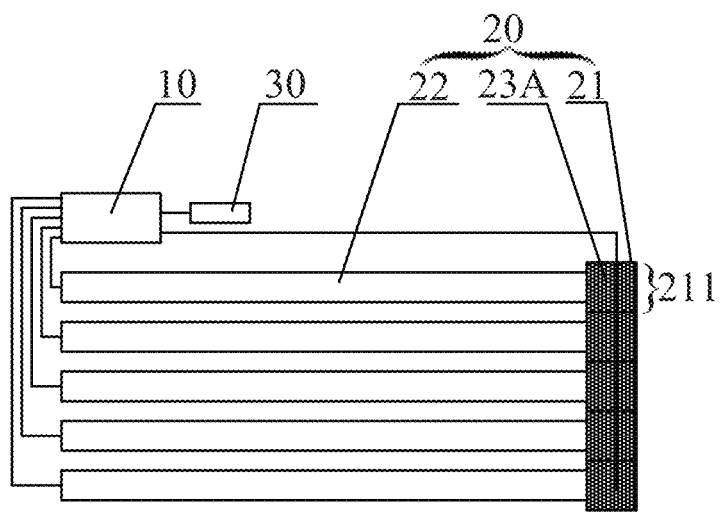
FIG. 8A is a first schematic structural view of another light shield device provided by the embodiments of the present disclosure.
Figure 8B:
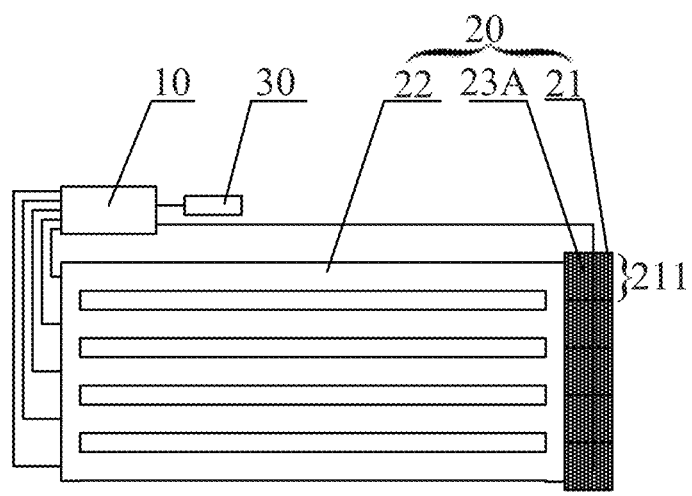
FIG. 8B is a second schematic structural view of the another light shield device provided by the embodiments of the present disclosure.

At least one embodiment of the present disclosure further provides another light shield device, as shown in FIG. 8A and FIG. 8B, and the light shield device includes the light shield structure 20, the light shield structure 20 includes the accommodating cavity 21 (which includes the plurality of sub-accommodating units 211, for example), the light shield material 23A (for instance, the electrowetting material or other types of material having the light-shielding property) disposed in the accommodating cavity 21, and at least one fluid tube 22. The at least one fluid tube 22 is communicated with the accommodating cavity 21. The light shield device is configured to allow the light shield material 23A to fill the at least one fluid tube 22.

For example, in the embodiments of the present disclosure, the manners for allowing the light shield material 23A to fill the at least one fluid tube 22 include but are not limited to the control of the electrowetting property of the light shield material and the adoption of the variable volume accommodating cavity (such manners may be referred to the description in related embodiments described above, and repeated descriptions are omitted herein), as long as the light shield material 23A can fill the fluid tube 22 from the accommodating cavity 21 under a state and can flow into the accommodating cavity 21 from the fluid tube 22 under another state.

For example, the light shield device provided by at least one embodiment of the present disclosure further includes the controller unit 10, which is a controller such as a processor or the like, for example. The controller unit 10 is configured to apply the voltage to the light shield structure 20, so that the light shield material 23A fills the at least one fluid tubes. For example, in other embodiments, the controller module can be independent of the light shield device and is configured to cooperate with the light shield device for use.

For example, the light shield device provided by at least one embodiment of the present disclosure further includes the ambient light sensor module 30 electrically connected with the controller module 10. The ambient light sensor module 30 is configured to detect the intensity of ambient light in front of the vehicle and transmit the information of the intensity of the ambient light to the controller unit 10.

The setting manners of the structures in the embodiments as shown in FIG. 8A and FIG. 8B can be referred to setting manners of the same components in the above embodiments, and repeated descriptions are omitted herein.

At least one embodiment of the present disclosure further provides an electronic device, which includes the light shield device including the controller module 10 and the light shield structure 20, provided by any foregoing embodiment. The light shield structure 20 includes the accommodating cavity 21, the light shield material (for instance, the electrowetting material 23 or other types of material having the light-shielding property) disposed in the accommodating cavity 21, and the at least one fluid tube 22. The at least one fluid tube 22 is communicated with the accommodating cavity 21. The controller module 10 is configured to apply the voltage to the light shield structure 20, so that the light shield material fills the at least one fluid tube 22.

For instance, the electronic device is smart glasses, a helmet, an anti-high beam glass plate, a mobile device (e.g., a vehicle), or the likes.

Based on the invention concept of the foregoing embodiments, the embodiments of the present disclosure further provide a vehicle. The vehicle includes a front windshield. The light shield device provided by the above embodiments is disposed on the front windshield. The light shield device is disposed in an area corresponding to the driver and may be disposed on an outer surface or an inner surface of the front windshield. In specific implementation, for example, the fluid tubes are arranged side by side on the front windshield from the top down, as shown in FIG. 1. This arrangement can ensure that each fluid tube is in a horizontal state, so that the influence of gravity on the filling speed of the electrowetting material can be avoided, and the shielding timeliness of the light shield device can be improved.

In case of driving normally during the day, the light shield device is in transparent state and does not interfere with the driver's normal driving. In case of driving at night, if the high beam is turned on by the opposite vehicle, the light shield device is activated to block the light of the high beam, thereby avoiding the strong light of the high beam from entering the human eyes to produce visual blind points for the driver, and ensuring driving safety.

In summary, in the light shield device, the light shield control method, the electronic device and the vehicle, provided by the embodiments of the present disclosure, the light shield structure includes the at least one fluid tube (for instance, the plurality of fluid tubes arranged side by side). When the controller module applies the voltage to the light shield structure, the wettability of the surface that is included by the fluid tube and is configured to contact the electrowetting material is improved, so as to change the three-phase contact angle between the outer edge of the electrowetting material and the surface of the fluid tube, allow the droplets at the outer edge of the electrowetting material to be deformed, drive the droplets at the outer edge of the electrowetting material to continuously move along the surface of the fluid tube, allow the outer edge of the electrowetting material to continuously move along the surface of the fluid tube, and then allow the electrowetting material to fill the fluid tube. Because the electrowetting material has the light-shielding property, the fluid tube filled with the electrowetting material can shield light. When the light shield device provided by the embodiments of the present disclosure is disposed on the front windshield at the position of the driver, when the high beam of the opposite vehicle is illuminated, the light shield device can be activated, so that the fluid tube filled with the electrowetting material can block the light of the high beam, thereby reducing the light intensity of the high beam, preventing the light of the high beam from causing visual blind spots for the driver, and improving the safety of night driving. When the opposite vehicle passes, the voltage applied to the light shield structure is removed; the wettability of the surface that is included by the fluid tube and contacts the electrowetting material restores the previous state, so that the electrowetting material restores the previous state, the fluid tube is not filled with the electrowetting material, and light can pass through the light shield device, so that the driver can restore normal driving.

What are described above is related to the illustrative embodiments of the disclosure only and not limitative to the scope of the disclosure; the scopes of the disclosure are defined by the accompanying claims.

What is claimed is:

1. A light shield device, comprising a controller module and a light shield structure, wherein
the light shield structure comprises an accommodating cavity, an electrowetting material being in the accommodating cavity and having a light-shielding property, and at least one fluid tube, and the at least one fluid tube is communicated with the accommodating cavity;
the controller module is configured to apply a voltage to the light shield structure, so that wettability of a surface of the at least one fluid tube is changed to allow the electrowetting material to fill the at least one fluid tube;
in a length direction of the at least one fluid tube, the at least one fluid tube is provided with a plurality of voltage applier units; and
in applying the voltage to the light shield structure by the controller module, the controller module is configured to sequentially increase voltages respectively corresponding to the plurality of voltage applier units in a direction from the accommodating cavity to the fluid tube.

2. The light shield device according to claim 1, wherein the controller module is configured to apply a voltage difference between the electrowetting material and the at least one fluid tube or apply the voltage difference between two opposite side walls of each fluid tube among the at least one fluid tube, so as to apply the voltage to the light shield structure.

3. The light shield device according to claim 1, wherein the at least one fluid tube comprises a plurality of fluid tubes arranged side by side.

4. The light shield device according to claim 3, wherein a gap is between adjacent fluid tubes among the plurality of fluid tubes.

5. The light shield device according to claim 1, further comprising an ambient light sensor module electrically connected with the controller module, wherein
the ambient light sensor module is configured to detect an intensity of ambient light; and
the controller module is further configured to determine whether the intensity of the ambient light is greater than or equal to a first threshold, and apply the voltage to the light shield structure in presence of a determination that the intensity of the ambient light is greater than or equal to the first threshold.

6. The light shield device according to claim 5, wherein the at least one fluid tube comprises first fluid tubes and second fluid tubes which are sequentially and alternately arranged;
in presence of the determination by the controller module that the intensity of the ambient light is greater than or equal to the first threshold, the controller module is configured to apply the voltage to the light shield structure, so that wettability of surfaces of the first fluid tubes are changed to allow the electrowetting material to fill the first fluid tubes;
the controller module is further configured to determine whether the intensity of the ambient light is greater than or equal to a second threshold and apply the voltage to the light shield structure in presence of a determination that the intensity of the ambient light is greater than or equal to the second threshold, so that wettability of surfaces of the second fluid tubes are changed to allow the electrowetting material to fill the second fluid tubes, and the second threshold is greater than the first threshold.

7. The light shield device according to claim 1, wherein the at least one fluid tube comprises a first fluid tube and a second fluid tube which are sequentially arranged; and
the controller module is configured to apply a voltage to a region where the first fluid tube is located and a region where the second fluid tube is located respectively at different times, so that the electrowetting material fills the first fluid tube and the second fluid tube respectively at different times.

8. The light shield device according to claim 1, wherein in the length direction of the at least one fluid tube, the plurality of voltage applier units are provided at a surface which is comprised by the at least one fluid tube and is configured to contact the electrowetting material.

9. The light shield device according to claim 8, wherein in removing the voltage from the light shield structure by the controller module, the controller module is configured to sequentially remove the voltages respectively corresponding to the plurality of voltage applier units in a direction from the fluid tube to the accommodating cavity.

10. The light shield device according to claim 8, wherein the plurality of voltage applier units are transparent electrodes.

11. The light shield device according to claim 1, wherein the accommodating cavity comprises a plurality of sub-accommodating units; the at least one fluid tube comprises a plurality of fluid tubes arranged side by side; the plurality of fluid tubes are communicated with the plurality of sub-accommodating units in a one-to-one manner; and the electrowetting material is in the sub-accommodating units.

12. The light shield device according to claim 1, wherein the electrowetting material comprises electronic ink.

13. The light shield device according to claim 1, wherein the at least one fluid tube comprises a plurality of fluid tubes; and end portions which are respectively comprised by the plurality of fluid tubes and are on a same side of the light shield structure are communicated with each other.

14. The light shield device according to claim 1, wherein each liquid tube among the at least one fluid tube is a transparent insulating tube.

15. A light shield control method, comprising:
applying a voltage to a light shield structure by a controller module, wherein
the light shield structure comprises an accommodating cavity, an electrowetting material being in the accommodating cavity and having a light-shielding property, and at least one fluid tube, and the at least one fluid tube is communicated with the accommodating cavity;
the controller module applies the voltage to the light shield structure, so that wettability of a surface of the at least one fluid tube is changed to allow the electrowetting material to fill the at least one fluid tube;
in a length direction of the at least one fluid tube, the at least one fluid tube is provided with a plurality of voltage applier units; and
in applying the voltage to the light shield structure by the controller module, the controller module is configured to sequentially increase voltages respectively corresponding to the plurality of voltage applier units in a direction from the accommodating cavity to the fluid tube.

16. An electronic device, comprising the light shield device according to claim 1, wherein the electronic device is smart glasses, a helmet, an anti-high beam glass plate, or a mobile device.

17. A vehicle, comprising a front windshield and the light shield device according to claim 1, wherein the light shield device is on a surface of the front windshield.

* * * * *